Oct. 26, 1937.   H. W. SAYLES   2,097,310
HEADLAMP TESTING APPARATUS
Filed Nov. 23, 1935   2 Sheets-Sheet 2
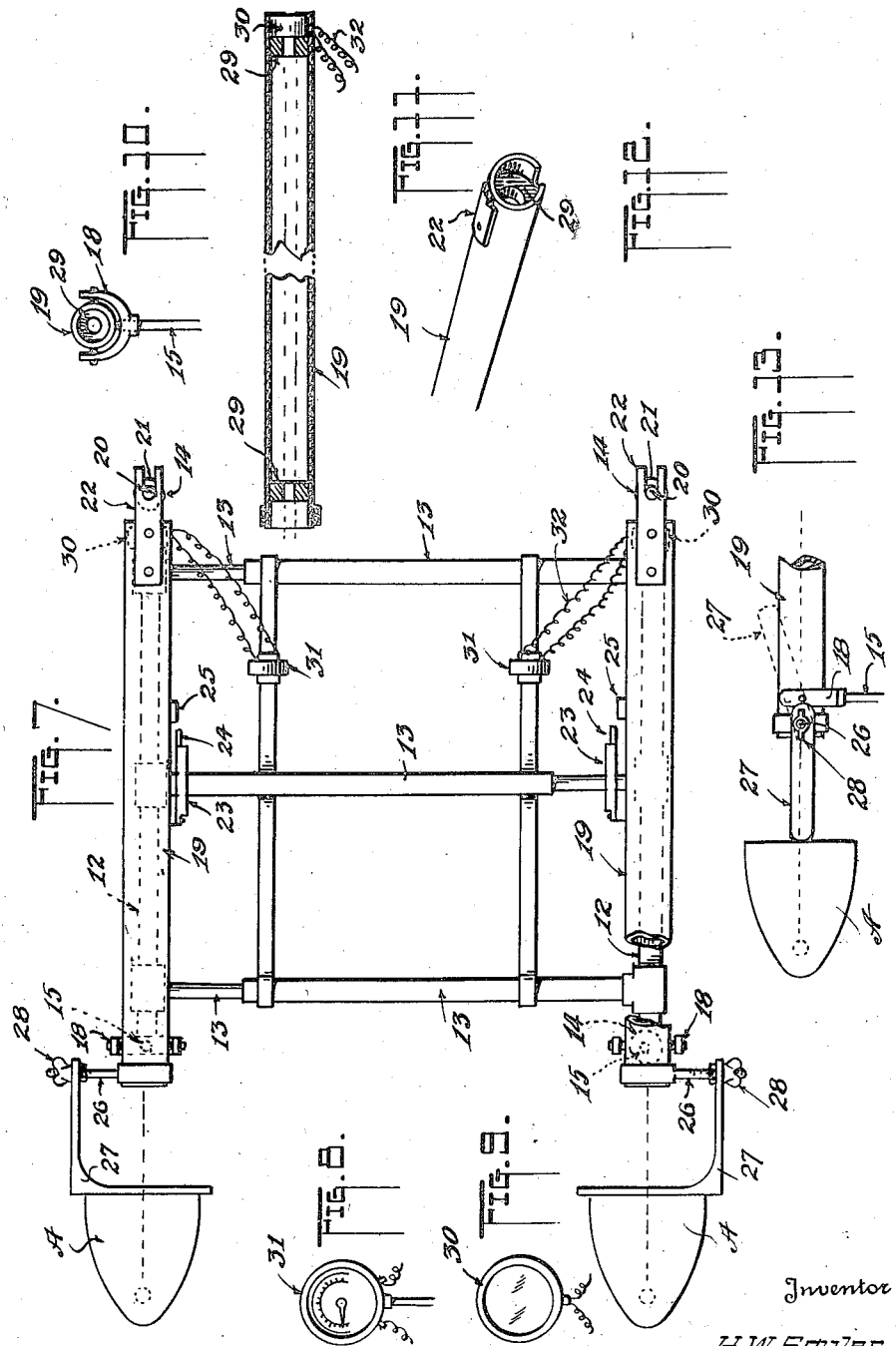
Inventor
H. W. Sayles,
By L. M. Hurlow
Attorney Patented Oct. 26, 1937

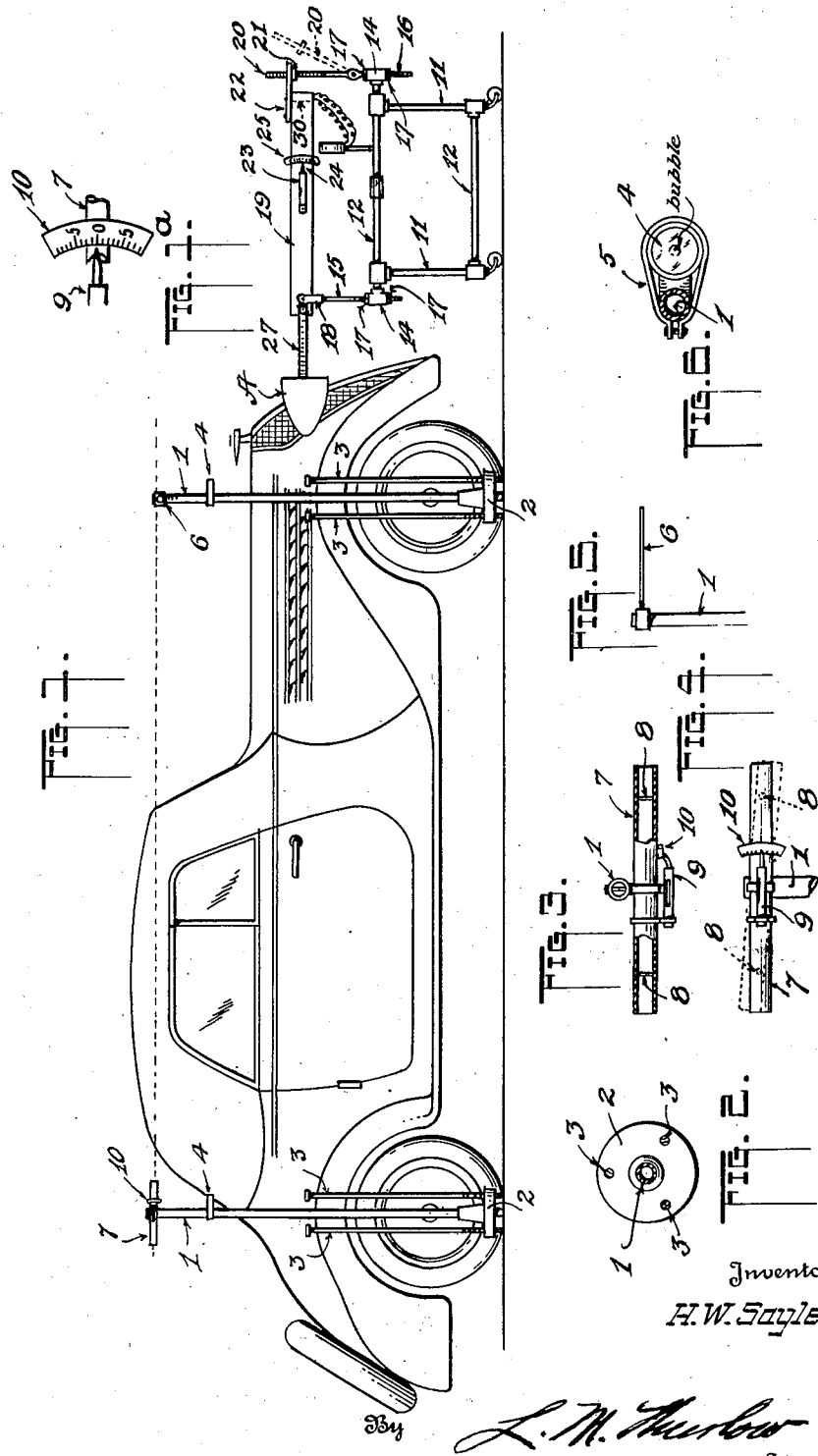

2,097,310

UNITED STATES PATENT OFFICE 2,097,310

HEADLAMP TESTING APPARATUS

Henry W. Sayles, Peoria, Ill.

Application November 23, 1935, Serial No. 51,260

6 Claims. (Cl. 88—14)

This invention relates to an apparatus for use in directing light rays from a light source to a predetermined point.

More particularly the invention has to do with the determination of the direction in which light rays of a single lamp or a pair of lamps of an automobile are to be projected in order that such rays will meet the roadway at the proper predetermined point in advance of such automobile.

The main object of the invention is the provision of means for bringing the projected light days of a pair of automobile "head lights" into parallelism and at the same time directing such rays upon a roadway at a proper predetermined point to the end that required and desired driving conditions may be brought about.

Another object is to provide means by which to accurately determine the axial line along and about which the light rays of an automobile head light are projected; to bring the light rays of a pair of head lights into parallelism; and finally through such means to direct the rays from both lights of a pair to proper road illuminating position.

Another object lies in providing means of such a nature through which to direct the light rays of a head light so that when the maximum of light transmitted therethrough is realized said rays may be directed upon a roadway at the desired point by orientation of such means and adjustment of the light source so that said rays conform in direction of travel to the line of the travel of the vehicle.

Still another object is the provision of means for determining the position of an automobile whose pair of head lights are to be adjusted, whether standing level or inclined endwise and to visually show such position on a graduated scale, and to furnish with such means cooperating mechanism for use in arranging for the adjustment of the lights to the end that the light rays from both can be brought into parallelism and otherwise directed, said mechanism having provision by which any angle of inclination of the vehicle may be readily determined.

Other objects and advantages will appear in the following descriptions aided by the appended drawings forming part hereof, wherein Figure 1 is a side elevation of a motor car showing means for determining any inclination of the same from a horizontal along its longitudinal line, together with mechanism for use in determining any adjustment required in the lamps of the car for properly directing light rays from said lamps.

Figure 1a is a side elevation of a graduated scale as used with certain means to be described.

Figure 2 is a plan of a supporting base for parts shown in Figure 1, certain members being shown in section.

Figures 3 and 4 are respectively a plan and a side elevation of a sighting tube and its parts shown in Figure 1.

Figure 5 is a rear elevation of a part shown in Figure 1 for use with the tube shown in Figures 3 and 4.

Figure 6 is a plan of a so called "spot level" showing its attachment to one end of one of the two standards shown in Figure 1.

Figure 7 is a plan of means for finding the axial line of projected light rays and its position with respect to a pair of automobile head lights.

Figures 8 and 9 are front elevations of an indicator and a light sensitive cell, respectively.

Figure 10 is an end elevation of a tubular member shown supported by a yoke-member, both illustrated in Figure 7.

Figure 11 is a longitudinal section of one of two tubular members shown in Figure 7.

Figure 12 shows a part of the member of Figure 11, and

Figure 13 is a side elevation of a lamp body of Figure 7 and part of the mechanism shown in that figure.

It is important that the light directed upon a roadway by the head light of a vehicle shall fall at the proper spot and be of maximum brilliancy or intensity.

Up to the present time, so far as is known, none but a more or less crude manner of determining the direction of travel of the rays of head lights has been employed, the results having been far from satisfactory since no means was included by which the exact direction in which the light beams were projected could be determined.

The present arrangement provides for the above requirements with exactness as may be understood from the following description:

First, in order to properly bring about a necessary adjustment of the housings of "head lights" carrying the light sources it is necessary to know whether the vehicle carrying the lights is resting upon a level surface or upon an inclined surface.

In my apparatus the proper adjustment of the lamp bodies or housings, as usually secured on the car and which are often found to have shifted from proper position, depends first upon the position of the vehicle as above with respect to certain steps to be taken in the entire procedure employed herein.

Therefore, to determine the vehicle's position there is placed at each wheel center, for example, an upright rod or standard 1 slidable vertically in a base 2 in a snug and true fit.

Said base is supported on three rods 3, for example, forming a tripod, the same having threaded engagement therewith. The adjustment of one or more of the rods 3 will naturally tilt the rod 1 so that that member may be set exactly "plumb" as indicated by a so called "spot-level", old and well known, indicated at 4 in Figure 6.

In that figure, 5 denotes, in this instance, a band by which to secure said level to the said upright rod or standard 1. Naturally, by proper adjustment of the rods 3 the bubble of the level may be exactly centered thus assuring an exact vertical position of said rod 1. One of the latter, which is preferably that at the front wheel, has an arm 6 extending laterally from its upper end at right angles to the vehicle's length.

Pivoted at its middle length to the top of the other or rear rod 1 at a point horizontally in line with the top of the arm 6, for example, is a sighting tube 7, see Figures 3 and 4. Within each end of the tube 7 is a horizontally disposed sighting wire 8 of quite small diameter adapted to be brought in line with the said rod arm 6 as suggested by the broken line in Figure 1. Pivoted at one end on the tube 7 is a spirit level 9 having a pointer at its other end to move adjacent a graduated scale 10 in fixed position on the tube this being best shown in Figure 1a, the mark "0" of the scale aligning with the axis of the bore of the said tube or at least with the two sighting wires 8, it being required, of course, that the spirit level 9 be likewise aligned. With the pivot of the tube 7 at exactly the same height from the lower end-surface of the supporting rod 1 as the upper surface of the arm 6 of the other rod, therefor, it is clear that if said rods 1 both rest upon the same exactly level surface the sight-line (broken line in Figure 1) will be exactly level provided the said rods have been properly plumbed by any such means as outlined previously. And at the same time the level 9 when adjusted for level will point exactly to "0" with its bubble in a central or midway position therein.

Let it now be supposed that the vehicle rests upon an inclined surface or at least has an inclined position. Upon sighting through the tube 7, the rods 1 being plumbed, the said tube will, of course, be directed downwardly due to the lower position of the laterally extended arm 6. On the other hand if the vehicle is tilted upwardly by resting in a reversed position on an inclined surface the opposite result will be shown with respect to the tube 7, that member then naturally being tilted upward. In either direction of tilt the level is brought to the level position in consequence of which its pointer will take a position above or below the "0" mark of the scale 10, as the case may be.

It is now clear that by the manipulation of the parts it can be determined whether the vehicle stands level or not, and, if the latter, the extent of tilt, as being preliminary to further steps wherein a cooperating apparatus is used and now to be described. That is to say, a wheel supported structure is provided which in this instance may include two frames, for example, made up of standards 11 and connecting members 12. The upper members 12 are connected by telescoping members 13, which serve to permit adjustment of said frames to and from each other so that certain members carried thereon to be described may be adjusted with respect to the axes of the head light bodies A of the vehicle to the end that both lights of a pair may be individually tested and adjusted regardless of degrees of spacing one from the other. Vertically adjustable within fittings 14 at the extended ends of the upper members 12, Figure 1, are threaded rods 15 and 16, for example, adjusted vertically by means of nuts 17, there thus being one of such rods at each of the four corners of the structure. Each of the rods 15 at what may be termed the forward side of the structure carries a yoke 18 to swivel thereon and pivotally hung in each yoke is the forward end of a tube 19 adapted to tilt vertically. Hingedly carried by each of the rods 16 at the rear of the structure is a means for supporting the rear end of a tube 19 which may comprise, for example, a threaded rod 20, a nut 21 thereon carrying the tube by means of a notched arm 22, for example, affixed to the latter. Pivoted at one end on each tube 19 is a "spirit level" 23, after the manner of the previously described level 9, the same carrying a pointer 24 to operate adjacent a graduated scale 25 similar to that in Figure 1a.

The tubes 19 of the structure just described are designed to be individually aligned with the axis of the housing of a head light A and that this aligning may be brought about a spacer is carried by each tube. That is to say, extending laterally from the forward end of each said tube is a stud 26, for example, swingable upon which is an arm or spacer 27 part of which is adapted to extend across and abut upon the face of the lamp body about as shown. A thumb-nut 28 serves to secure the arm with respect to the tube, and said arm may be swung out of position when desired as shown in broken lines in Figure 13.

In Figure 11 within and near each end of the tube 19 shown is an apertured diaphragm 29. Also within the rear end of each tube is stationed adjacent the apertured diaphragm thereof at said end a light sensitive cell 30, now well known, while mounted on the framing of the apparatus is a pair of indicators 31 each connected electrically by wires 32 with a cell 30.

The described apparatus having been placed in front of the vehicle and in abutment with the lamp bodies A further operations with regard to adjusting the light sources may proceed. Noting the reading on the scale 10, as shown by the level 9 as heretofore outlined, such reading is transferred to each of the scales 25 of the tubes 19 by tilting the levels 23 thereof on their pivots to agree in readings with that of the said scale 10, whereupon the tubes 19 are adjusted on their pivots at the yokes 18 until the said levels 23 are brought into exactly horizontal or level position the axes of the tubes then exactly coinciding in position with the line of tilt of the vehicle, except for a slight difference to appear presently, it being presumed that the forward ends of the tubes have been stationed at the exact centers of the lamp bodies through adjustments of the parts of the mechanism already described, the spacers 27 serving to align the axes of the tubes with the longitudinal line of the vehicle.

When the tubes are properly located the intensity of light passing through the apertures 29 from the lamps will be shown by the indicators 31 of the sensitive cells, or a minimum or a maximum of light, or various degrees thereof, being transmitted according to perfection of alignment, the highest reading at the indicator 31 being possible if the lamps and reflectors are in proper adjustment and the apertures of the tubes are in alignment therewith.

To be effective in lighting the roadway it is required that the rays meet such roadway at a point say about 250 feet in advance of the vehicle, this distance being that usually fixed upon as about correct.

In order that this result may be obtained the scales 25 are so arranged when fixing them to the tubes 19 that the "0" marks will be set slightly to one side of the axial lines of such tubes to give the slight dip necessary, this angle of inclination being naturally transferred to the lamps during the adjustments thereof for maximum light.

These adjustments are made during the following tests: It may be found that after the exact setting of the tubes 19, maintained by the adjustments of the threaded rods 15, 16 and 20 through the nuts provided for the purpose, the axes of the lights do not coincide with those of the tubes so that maximum light does not pass through both apertures of the diaphragms 29. Without changing the adjustments of the rods 20 either tube may be grasped and its rod 20 may be swung on its hinge away from the tube supported by it as shown in broken lines in Figure 1. Said tube, since now held in the hand, may be swung at its rear end in all directions about its supported front end until the cell 30 by a maximum of light thrown thereon shows a maximum reading at the indicator 31.

Noting the angle of the tube at this time the operator is at once governed as to the direction in which the lamp body or housing A is to be adjusted. Thereupon, the tube being returned to its mounted position, the said body is then adjusted to yield the exact results with respect to maximum light transmission through the tube as shown by the said cell 30 and indicator 31.

It is readily apparent that in the use of a tube of considerable length having widely separated apertured diaphragms exactness of adjustment can be realized so that the light rays from a lamp can be very accurately directed in a forward and downward direction or to any exact point desired, parallelism of light rays of both lamps also resulting. It is seen from what has been stated heretofore with regard to the levels and scales that whether the vehicle is resting upon a level surface or has an inclined position lengthwise in either direction the required adjustments of the lamp bodies for proper road lighting must result.

While the cell 30 and indicator 31 are preferable as the means for indicating light intensity it may be possible, perhaps by sighting through the tube 19 toward the light, to determine in a fairly close manner the degree of light transmitted but this method, of course, would not be as satisfactory.

The spacers or arms 27 are used to locate the tubes 19 in their relative positions with respect to the lamps A and to provide general alignment of the axes of said tubes with the longest axis of the vehicle, or, stated in another way, to bring said axes parallel to the line of travel of the said vehicle. The front and rear threaded rods 15 and 16 serve to maintain parallelism of the axes of the tubes and their parallelism with the said vehicle axis during the lamp adjusting operations.

It is presupposed, of course, that the vehicle tires are in proper running condition for the road in that they are of equal pressure so that any adjustment of the head lights will be correct so far as insuring that the light beams will meet the road surface at the proper point.

Naturally, if the vehicle under test rests truly horizontal the level or "0" marks of the scales 10 and 25 will be indicated by the levels and adjustments are made as already described, the tubes 19 in that event tilting but slightly just below a horizontal line.

It is to be understood that changes may be made in the structures described since I have merely shown and described a means as an example of what may be used for carrying and adjusting the main parts entering into the aligning operations. And while I have shown a form of means for finding the position of the longitudinal axis of the vehicle it is understood that I may not confine myself to the structure shown but may adopt equivalent means for that purpose to the end, in any event, that such position of the axis may be found and that it may be transferred to the balance of the mechanism employed for bringing about final lamp-body adjustments, any such means for the named purpose lying within the spirit of the invention and within the meaning of the appended claims.

I claim:

1. Mechanism for the purpose described including in combination, a support, a tube mounted thereon having its longest axis in line with the light source of an automobile headlamp and having two spaced diaphragms therein each provided with an aperture, said tube being swiveled at its end nearest said light source in a manner to permit universal swinging movement at its other end, a light sensitive measuring means in said tube, and means normally fixed in position on the support with which the tube is adapted to be engaged for supporting such tube at said other end, the said fixed means, the light source and the axes of the apertures all lying in a vertical plane when said tube is so engaged.

2. Mechanism for the purpose described including in combination, a support, a tube mounted on the support having its longest axis in line with the light source of an automobile headlamp and having two spaced diaphragms therein each provided with an aperture, said tube being swiveled at its end nearest said light source in a manner to permit universal swinging movement at its other end, a light sensitive cell in said tube at its said other end for receiving light rays passing through both apertures from said source, means for supporting said other end of the tube and means for indicating the intensity of light reaching said cell.

3. Mechanism for the purpose described including in combination, a support with one end opposite the light source of an automobile headlamp, and a tube mounted on the support having its longest axis in line with said source, said tube having two spaced diaphragms therein each provided with an aperture, said tube being swiveled at its end nearest the light source to permit it to swing in all directions at its other end, normally fixed means with which said other end of the tube is adapted to be engaged and supported, said means, the light source, and the axes of the apertures all lying in a vertical plane when said tube is so engaged, a light sensitive cell in said tube at its end distant from its swiveled end, and means for indicating the intensity of light reaching said cell through said apertures.

4. Mechanism for the purpose described including, in combination, a support, a tube pivotally supported at one end on said support and having its longest axis in line with the axis of the light source of a headlamp mounted on an automobile, a light sensitive measuring means in said tube, a rod for supporting said tube at its other free end and erected on the said support, the said free end of the tube being vertically guided by said rod, means on the rod for vertically adjusting said free end, a graduated scale mounted in a vertical plane on the tube, and a pointer pivoted on the tube adjacent the scale and including a level indicating device.

5. The invention according to claim 4 wherein the pivotal mounting of the tube is adapted to permit the free end of such tube to have universal swinging movement.

6. In means for directing the position of adjustment of the headlamp of an automobile in accordance with an indicated level or inclined position of the latter lengthwise through a scale and a levelling device pivoted at said scale, the combination of a support forward of the said lamp, a tube pivotally mounted on the support to tilt vertically at one end adjacent said lamp for passage of light beams through said tube, the tube including therein a light sensitive measuring means, means carried by the support to maintain the tube in alignment with a vertical plane paralleling the front to rear axis of the vehicle and passing through the source of light, a graduated scale affixed to the tube in a substantially vertical plane, such graduations indicating positions on the road where the light beams should fall, a pointer pivotally mounted on the tube adjacent the scale to tilt vertically and including a level indicating device, and means for providing vertical adjustment of the tube at the end thereof farthest from its pivotal mounting, said level indicating device being adjustable at the scale in accordance with the position of the adjusted level indicating means first mentioned.

HENRY W. SAYLES.